United States Patent [19]

Parker

[11] 4,372,175
[45] Feb. 8, 1983

[54] AUTOMATIC PIPETTOR EMPLOYING AN ADJUSTABLE VOLUME DELIVERY PUMP

[75] Inventor: Bernard Parker, Westport, Conn.

[73] Assignee: Baker Instruments Corp., Bethlehem, Pa.

[21] Appl. No.: 221,152

[22] Filed: Dec. 29, 1980

[51] Int. Cl.³ .............................................. B01L 3/02
[52] U.S. Cl. ............................... 73/864.17; 73/864.18
[58] Field of Search .................. 422/100; 73/864.12, 73/864.17, 864.18

[56] References Cited

U.S. PATENT DOCUMENTS

| 3,800,984 | 4/1974 | Phelan | 422/100 |
| 3,982,899 | 9/1976 | Kelm | 222/309 |
| 3,991,616 | 11/1976 | Stahli | 73/864.16 |
| 4,207,074 | 6/1980 | Suzuki | 73/864.12 |

Primary Examiner—S. Clement Swisher
Attorney, Agent, or Firm—George W. Rauchfuss, Jr.

[57] ABSTRACT

Pipettor apparatus for dispensing accurate and precise amounts of liquid employs a first pump having a delivery capacity sufficient to handle substantially all of the liquid to be dispersed and a second pump whose delivery capacity is adjustable and only a fraction of the capacity of the first pump.

6 Claims, 3 Drawing Figures

AUTOMATIC PIPETTOR EMPLOYING AN ADJUSTABLE VOLUME DELIVERY PUMP

Automatic pipettors for dispensing accurate and precise amounts of various liquids are well known in the prior art. Such devices are particularly useful in medical laboratories, for example, where a liquid specimen, such blood serum, is dispensed into a test vial, transfer disc cavity, etc. along with an accurate and precise amount of liquid reagent for carrying out certain specific tests. Pipettors of this type are described and claimed in U.S. Pat. No. 4,046,511 issued to J. Stabile on Sept. 6, 1977 and assigned to the common assignee hereof, the disclosure which is incorporated herein by reference.

In the manufacture of these pipettors, it is difficult if not impossible to assemble the various pipettor parts with the accuracy and precision necessary to enable each pipettor to dispense exactly the same amount of liquid. This is not ordinarily a problem except in those instances where the pipettor is used to dispense very small amounts of liquid such as less than about one drop (each drop of water, for example, equals about 20 to 30 microliters). The liquid that is held inside the pipettor nozzle will usually form a convex or concave meniscus at the nozzle tip depending on several factors, e.g., surface tension of the liquid, the material of which the nozzle tip is made, the speed of delivery, etc. The difference in volumetric displacement that occurs in the case of two nozzles otherwise identical except that they each contain a liquid forming a different meniscus at the tip can result in a substantial variance in the total liquid dispensed, e.g. about 0.5 to 1.0 microliter or more. Therefore it will be seen that there is a need for a pipettor which can be easily and readily adjusted to make very small or minute changes in the total volume of liquid dispensed.

SUMMARY OF THE INVENTION

The present invention is directed to a novel and improved automatic pipettor for dispensing accurate and precise amounts of a liquid medium. The pipettor includes a nozzle having a tip equipped with an orifice for dispensing a liquid into a test vial, transfer disc cavity or the like. The pipettor also includes a first pump having a delivery capacity sufficient to handle substantially all of the liquid to be dispensed and a second pump whose a delivery capacity is adjustable and is only a fraction of the capacity of the first pump. The first pump is connected to the nozzle through means of a liquid passageway or tube and the second pump is connected into the same liquid passageway or tube in series between the first pump and the nozzle. Both the first and second pumps are two-stroke positive displacement, piston pumps which are driven by electrically activated motors. An electrical circuit is also provided including a timer for individually activating the motors. In operation, the motors are activated in a manner whereby the first pump draws a specified amount of a liquid to be dispensed through the nozzle orifice and then expels this liquid through the orifice while at the same time the second pump adds or subtracts a small amount of liquid, as the case may be, to accurately deliver the total amount of liquid desired.

A principal object of the present invention is therefore to provide a novel and improved automatic pipettor for dispensing an accurate and precise amount of a liquid medium.

Another object of the present invention is to provide such an automatic pipettor which can be easily and quickly adjusted to accurately deliver the total amount of liquid desired.

DESCRIPTION OF A PREFERRED EMBODIMENT

Figure 1:
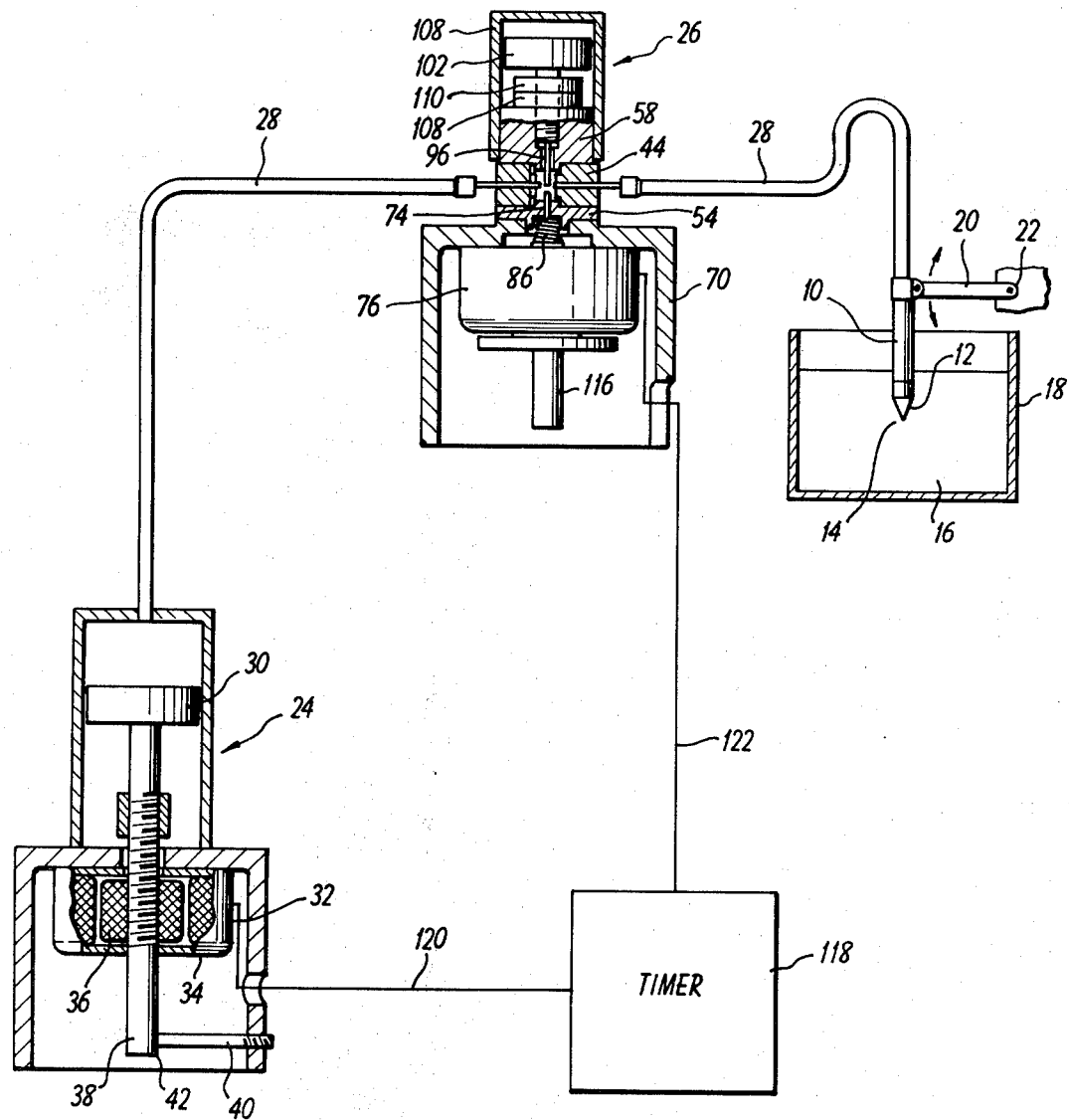
FIG. 1 is a schematic view of an improved automatic pipettor system in accordance with the present invention.

Referring now to FIG. 1, there is shown a preferred embodiment of an automatic pipettor according to the present invention. As shown, the pipettor includes a nozzle 10 having a tip 12 provided with an orifice 14 through which a liquid 16 is drawn from a reservoir tank 18. The nozzle 10 is mounted to the outer end of an arm 20 which is movable in a vertical directial about a pivot 22 and movable in a horizontal direction by a suitable drive mechanisms not shown. For the sake of convenience, the pipettor is shown in the so-called "pick up" mode with the nozzle tip 12 submerged in the liquid 16 for drawing the liquid into the pipettor system. However, it will be understood that after completion of this operation the nozzle 10 is withdrawn from the reservoir tank 18 by moving the arm 20 upwards as indicated by the arrows and then relocated to another position where the liquid is expelled through the nozzle orifice 14.

The pipettor further includes two delivery pumps 24, 26. The first pump 24 has a delivery capacity which is sufficient to handle substantially all of the liquid to be dispensed. The second pump 26 has a delivery capacity which is adjustable as shall be described in detail hereinafter and which is only a fraction of the capacity of the first pump 24. As shown in FIG. 1, the second pump 26 is connected in series between the first pump 24 and the nozzle 10 via the tube 28.

The first pump 24 is a conventional two-stroke, fixed volume delivery pump having a piston 30 which is driven by an electrically-actuated device 32. Although this device may be any conventional electrically actuated device having reversible poles such as an electric motor or solenoid, for example, it is preferable to employ a linear stepper motor as schematically shown in the drawing. Typically, this stepper motor includes stationary poles 34 and a rotor 36 which threadably engages a drive shaft 38. The shaft 38 is keyed against rotation by a pin 40 located in a slot 42 at its lower end but is free to move linearly in either axial direction upon rotation of the rotor 36.

Figure 2:
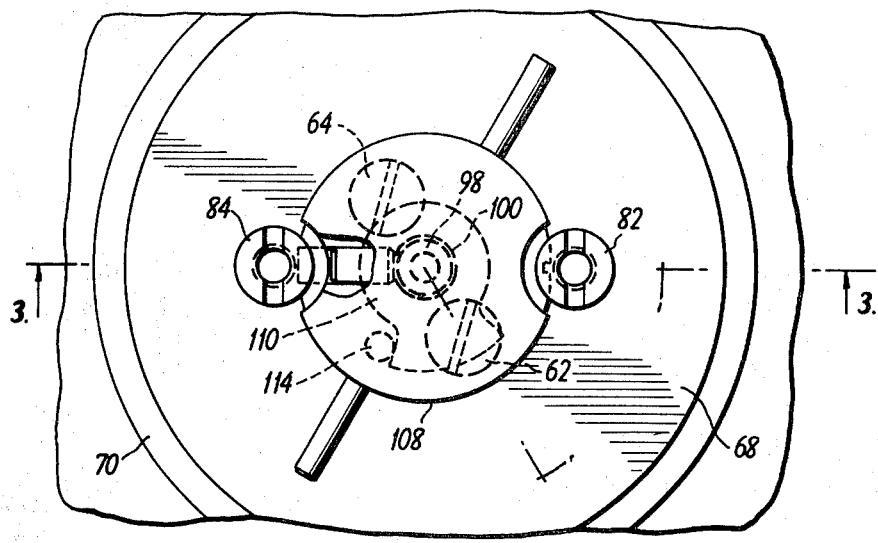
FIG. 2 is a plan view of an adjustable volume delivery pump used in the pipettor system of FIG. 1.
Figure 3:
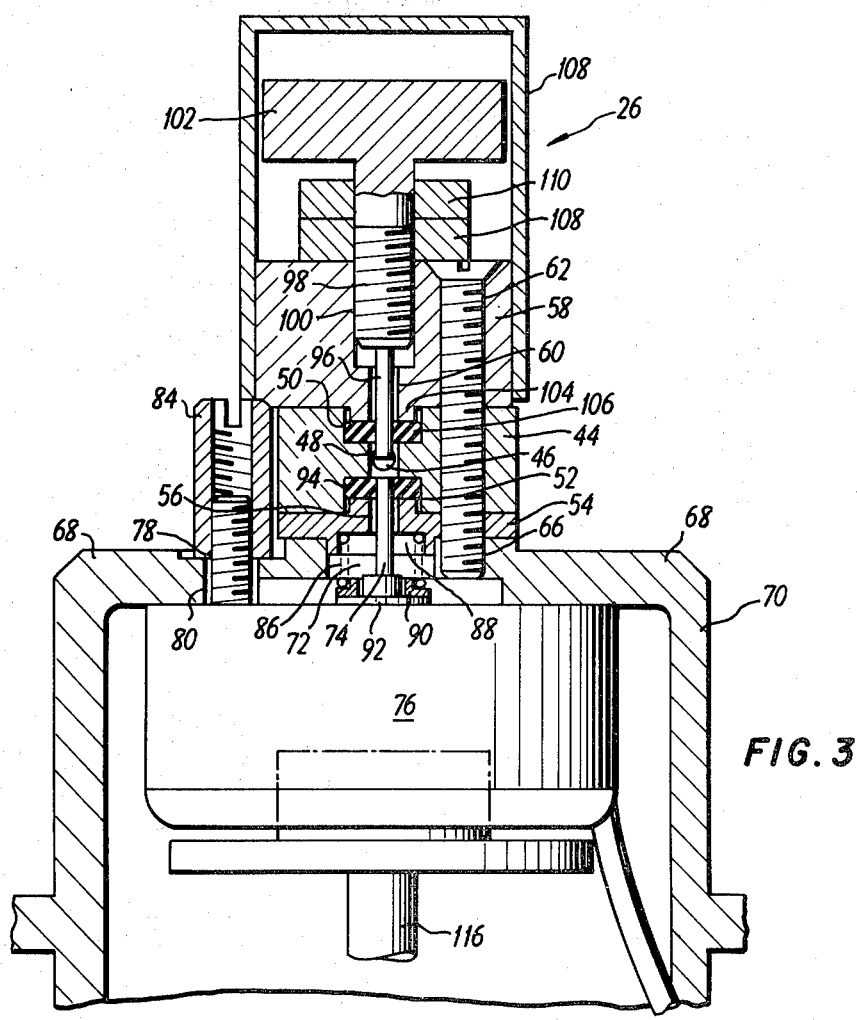
FIG. 3 is an elevational view in section of the pump taken along with the line 3—3 in FIG. 3.

As shown in FIGS. 2 and 3, the delivery pump 26 comprises a cylindrical valve body 44 having a diametrically disposed, horizontal bore 46 for passage of a liquid. The valve body 44 also includes an axial bore 48 which intersects the horizontal bore 46 and which terminates in enlarged diameter recesses 50, 52, respectively, at each opposite end of the valve body 44. A circular base plate 54 having a central opening 56 is mounted against the bottom end of the valve body 44. Similarly, a valve cover plate 58 having a central opening 60 is mounted against the top end of the valve body 44. Both the base plate 54 and the cover plate 58 are held in place with their respective central openings 56, 60 in alignment with the axial bore 48 by means of two flat head screws 62, 64 (see FIG. 3). These screws pass through the top cover plate 54, pump body 44 and base plate 58 and threadably engage tapped holes 66 in the top wall 68 of an enlarged bell-shaped heat sink 70. The top wall 68 also has an enlarged central opening 72 which aligns with the opening 56 in base plate 54.

An elongated, small diameter piston 74 passess through the central opening 56 and extends into the axial bore 48 in pump body 44. The elongated piston 74 is driven in either one or two directions in the axial bore 56 by an electrically-activated motor 76. The motor 76 in this instance is preferably a solenoid of conventional design and is secured in place by threaded studs 78 which pass through corresponding holes 80 in top wall 68 and by round nuts 82, 84.

A helical compression spring 86 is mounted inside a tubular recess 88 in the bottom of the base plate 54 and is held in place by a spring retainer 90 and retainer ring 92 which is attached to piston 74. The spring 86 biases the piston 74 back against the solenoid body 76 retaining it there when the solenoid 76 is de-energized. An O-ring 94 is placed inside the circular recess 52 and seals off the lower end of the axial bore 48 under the assembly load applied by screws 62, 64 through base plate 54.

An adjustable pin 96 is mounted inside the central opening 60 of top cover plate 58 and also extends into the axial bore 48. The pin 96 is attached to the lower end of a screw 98 and is movable in either direction inside the axial bore 48. The location of the pin 96 can be precisely adjusted by means of the screw 98 which is threaded inside the enlarged diameter opening 100 in the top cover plate 58. A knob 102 is fixedly secured to the screw 98 for convenience in making the necessary adjustments in the location of the pin 96.

Top cover plate 58 also includes a circular protuberance 104 which fits inside the circular recess 50 at the top end of the pump body 44. An O-ring 106 is placed inside the circular recess 50 and is held under compression by the protuberance 104 to seal off the upper portion of the axial bore 48.

A transparent plastic cap 108 may be provided to cover the knob 102 and prevent any accidental movement once the knob has been adjusted. Suitably, the side walls of the plastic cap 108 and can be made to fit snugly over the top cover plate 58 and yet permit the cap to be easily removed when necessary. Also, if desired, a pair of cam blocks 110, 109 may be arranged around the adjustable screw 98 along with a stop pin 114 as shown in phantom lines in FIG. 2, in order to provide a limiting means for making total stroke adjustments for pin 96 and thereby limiting the stroke of piston 74.

As indicated, the solenoid motor 76 is of a conventional design and includes a drive shaft 116 which is fixedly secured to the lower end of the elongated piston 74. The upward movement of the drive shaft 116 is limited by the pin 96 attached to the knob 102 and screw 98, while the downward movement of the shaft 116 attached to piston 74 is limited by retainer 92 which is attached to piston 74 and acts against solenoid 76.

The solenoid motor 76 for operating the pump 26 as well as the motor 32 for operating the first pump 24 are each activated by an electrical circuit including a timer 118. The timer 118 may be of any conventional design such as a cam-operated switch mechanism or an electronic digital clock. As shown, the timer 118 is connected to the motor 32 for operating the first pump 24 by a wire conductor 120 and similarly to the solenoid motor 76 for operating the pump 26 by conductor wire 122.

In operation of the pipettor, a series of short electrical pulses are fed from the timer 118 to the motor 32 via the wire conductor 120 to actuate the stepper motor 32 and lower the piston 30 inside pump 24 thereby drawing through the nozzle orifice 14 a specified amount of liquid from the reservoir tank 18. Typically, the design of the motor 32 may be such that each pulse causes the rotor 36 to rotate through an angle of 7.5 degrees and the shaft 38 to move a corresponding distance in the linear direction. The arm 20 is then lifted to remove the nozzle 10 from the tank 18 and relocate the nozzle at a different location where the liquid is to be dispensed. A series of short electrical pulses are again fed from the timer 118 to the motor 32 but in this instance the polarity of the stationary poles 34 are reversed and the piston 30 is thereby caused to move via shaft 38 in an upward direction, i.e., compression stroke, expelling the liquid through the nozzle orifice 14. This procedure is preferably repeated several or more times with the same quantities of liquid to be dispensed. If the amount of liquid actually expelled through the nozzle orifice 14 is consistently below the amount specified or desired, then the appropriate adjustment can be made to the pump 26 to compensate for this deficiency. This adjustment is quite easily made by simply rotating the knob 102 on the threaded stem 98 in a counter-clockwise direction which in turn raises the pin 96 to a new location inside the axial bore 48. During the next and subsequent vacuum strokes of the piston 30 in first pump 24 to draw liquid through the nozzle orifice 14, the elongated smaller diameter piston 74 of pump 26 is drawn downwardly in axial bore 48 to its stop position as hereinabove described when the solenoid motor 76 is de-energized. It will be seen that in this mode of operation the elevation of the pin 96 in axial bore 48 will allow a small additional volume of liquid to be drawn through the nozzle orifice 14 into the tube 28. The stepper motor 32 is again activated by a series of short electrical pulses fed to it from the timer but in this instance the polarity of the stationary poles 34 are again reversed and the shaft 38 moves the piston 30 upwardly in its compressive stroke to expel liquid in the tube 28 through the nozzle orifice 14. This procedure can be repeated again if necessary to readjust the location of the pin 96 in axial bore 48 until the actual amount of liquid expelled through the nozzle orifice 14 coincides exactly with the specified amount of liquid to be dispensed.

Conversely, if the amount of liquid actually expelled through the nozzle orifice 14 is greater than the amount specified or desired, then the pump 26 can be adjusted in a similar manner to remove a small amount of liquid from the tube 28. This is readily accomplished by rotating the knob 102 on the threaded stem 96 in a clockwise direction which in turn results in lowering the pin 96 in axial bore 44. The motor 32 is again actuated by a series of short electrical pulses from the timer 118 and the piston 30 is raised in its compressive stroke and thereby expelling liquid from the tube 28 through the nozzle orifice 14. At the same time, an electrical signal is fed from the timer 118 via the wire conductor 122 to the solaroid motor 76 which activates the motor and moves the elongated, small diameter piston 74 upwardly in the axial bore 44 until it contacts the lower end of the pin 94 and comes to rest. The movement of the piston 74 in the axial bore 44 causes a small additional amount of liquid to be expelled through the tube 28 and nozzle orifice 14. This procedure can be repeated again until the exact amount of liquid to be dispensed is actually expelled through the nozzle orifice 14. Once the pump 26 has been finally adjusted to either add or subtract the required amount of liquid in the tube 28, no further adjustments are generally required so long as the same liquid is dispensed through the same nozzle.

It will be understood that the electrical circuit referred to for operating the pump motors 32, 76 will incorporate various components (not shown) in addition to the timer 118 such as a power supply, pulse generator, etc. as will readily occur to those skilled in the art. Suffice it to say at this point that the electrical circuit includes means for electrically actuating the stepper motor 32 for driving the piston 30 of first pump 24 through a complete cycle, that is, a vacuum stroke in order to draw a specified amount of liquid through the nozzle orifice 14 and a compressive stroke in order to expel the liquid again through the same orifice 14. The circuit also includes means operative during this complete cycle to energize and de-energize the solenoid motor 76, as the case may be, in order to place the pump 26 in its additive or subtractive mode. The operation of the pipettor may be better understood by the following examples: Assume the first pump has a fixed volume delivery capacity of 100 microliters and it is desired to actually expel a slightly lesser quantity of liquid from the nozzle, say 95 microliters. In this instance, the second adjustable volume delivery pump is placed in the subtractive mode as described above and the small diameter piston 74 is raised inside the axial bore 44 by the solenoid motor 76 to expel 5 microliters of liquid while the first pump at the same time draws its full capacity of 100 microliters inside the tube 28. In the next step, the piston 74 is drawn downwardly and inhales about 5 microliters of air. The first pump driven by motor 32 then expels all of the liquid remaining in the tube 28, i.e., 95 microliters, through the nozzle orifice 14.

Assuming the same conditions except that the pipettor in this instance is to dispense 105 microliters of solution, the variable volume delivery pump 26 is now placed instead in the additive mode as described above with the piston 74 drawn down in the axial bore 48 by de-energizing the solenoid 76. The piston 30 is lowered inside pump 24 and draws 100 microliters of solution into tube 28 plus an additional 5 microliters in the second pump 26. Both pumps are then actuated simultaneously or in close sequence to expel a total of 105 microliters of solution through the nozzle orifice 14.

In another example, a pipettor was constructed using a first pump driven by a stepper motor wherein each pulse or step resulted in a displacement of about 1 microliter of water and a second adjustable volume delivery pump driven by a conventional solenoid. The first pump had a resolution of 1 microliter up to a total delivery of 350 microliters while the second pump had a resolution of 0.01 microliters to a total delivery of 1.5 microliters.

What is claimed is:

1. Pipettor apparatus for dispensing accurate and precise amounts of a liquid medium which comprises, in combination:
    (a) a nozzle having a tip equipped with an orifice for dispensing a liquid;
    (b) a first fixed volume pump having a capacity sufficient to handle substantially all of the liquid to be dispensed;
    (c) a second variable volume delivery pump having a capacity which is only a fraction of the capacity of said first pump and said second pump adapted to add or subtract liquid;
    (d) said first pump being connected to the nozzle through means of a liquid passageway and said second pump being connected into the same liquid passageway in series between said first pump and said nozzle;
    (e) said first and second pumps each including a two-stroke piston driven by an electrically activated device; and
    (f) electrical circuit means including a timer for activating said device whereby said first pump draws a specified amount of liquid to be dispensed through said orifice and then expels this liquid through said orifice while at the same time said second pump adds or subtracts a small amount of liquid to accurately deliver the total amount of liquid desired.

2. Pipettor apparatus according to claim 1 wherein the device for driving the two-stroke piston of said first pump is an electric stepper motor.

3. Pipettor apparatus for dispensing accurate and precise amounts of a liquid medium which comprises, in combination:
    (a) a nozzle having a tip equipped with an orifice for dispensing a liquid;
    (b) a first fixed volume pump having a capacity sufficient to handle substantially all of the liquid to be dispensed;
    (c) a second variable volume delivery pump having a capacity which is only a fraction of the capacity of said first pump and said second pump adapted to add or subtract liquid;
    (d) said first pump being connected to the nozzle through means of a liquid passageway and said second pump being connected into the same liquid passageway in series between said first pump and said nozzle;
    (e) said first and second pumps each including a two-stroke piston driven by an electrically activated device and wherein the device for driving the two-stroke piston of the second pump is an electric solenoid; and
    (f) electrical circuit means including a timer for activating said device whereby said first pump draws a specified amount of liquid to be dispensed through said orifice and then expels this liquid through said orifice while at the same time said second pump adds or subtracts a small amount of liquid to accurately deliver the total amount of liquid desired.

4. Pipettor apparatus for dispensing accurate and precise amounts of a liquid medium which comprises, in combination:
    (a) a nozzle having a tip equipped with an orifice for dispensing a liquid;
    (b) a first fixed pump having a capacity sufficient to handle substantially all of the liquid to be dispensed;
    (c) a second variable volume delivery pump having a capacity which is only a fraction of the capacity of said first pump and said second pump adapted to add or subtract liquid;
    (d) said first pump being connected to the nozzle through means of a liquid passageway and said second pump being connected into the same liquid passageway in series between said first pump and said nozzle;

(e) said first and second pumps each including a two-stroke piston driven by an electrically activated device; and (f) electrical circuit means including a timer for activating said device whereby said first pump draws a specified amount of liquid to be dispensed through said orifice and then expels this liquid through said orifice while at the same time said second pump adds or subtracts a small amount of liquid to accurately deliver the total amount of liquid desired, and wherein said second variable volume delivery pump comprises, in combination:

(1) a pump body having an axial bore which intersects a fluid passageway;

(2) an elongated, small diameter piston disposed in said axial bore and connected to said electrically-activated device at one end of said pump body;

(3) a stop pin movably disposed in said axial bore and adapted to limit the travel of said elongated piston a predetermined distance in said axial bore; and (4) a means for adjusting the location of said stop pin at the opposite end of said pump body.

5. Pipettor apparatus according to claim 4 wherein said adjusting means comprises an elongated threaded stem rotatably disposed inside an opening in a top cover mounted over the opposite end of said pump body, said threaded stem being connected to said pin at one end and having an adjustable knob at the opposite end thereof.

6. Pipettor apparatus according to claim 5 including a protective cover which fits over said knob and threaded stem.

* * * * *